United States Patent
Weiffen

(10) Patent No.: US 9,641,116 B2
(45) Date of Patent: May 2, 2017

(54) METHOD AND DEVICE FOR OPERATING AN ASYNCHRONOUS MACHINE, AND AN ASYNCHRONOUS MACHINE

(71) Applicant: Robert Bosch GmbH, Stuttgart (DE)

(72) Inventor: Manfred Weiffen, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/901,437

(22) PCT Filed: Jun. 4, 2014

(86) PCT No.: PCT/EP2014/061525
§ 371 (c)(1),
(2) Date: Dec. 28, 2015

(87) PCT Pub. No.: WO2014/206692
PCT Pub. Date: Dec. 31, 2014

(65) Prior Publication Data
US 2016/0156298 A1    Jun. 2, 2016

(30) Foreign Application Priority Data
Jun. 25, 2013 (DE) .................. 10 2013 212 054

(51) Int. Cl.
*H02P 1/24* (2006.01)
*H02P 23/08* (2006.01)
*H02P 27/06* (2006.01)

(52) U.S. Cl.
CPC .............. *H02P 23/08* (2013.01); *H02P 27/06* (2013.01)

(58) Field of Classification Search
CPC ........ H02K 17/00; H02K 17/02; H02K 17/04; H02K 17/18; H02K 17/20; H02K 17/36;
(Continued)

(56) References Cited

U.S. PATENT DOCUMENTS

| 4,757,248 | A | | 7/1988 | Fujioka et al. |
| 5,334,923 | A | * | 8/1994 | Lorenz ............... H02P 6/187 |
| | | | | 318/805 |
| 2007/0018603 | A1 | | 1/2007 | Aleyt et al. |

FOREIGN PATENT DOCUMENTS

| AT | 511134 | 9/2012 |
| EP | 1225684 | 7/2002 |

(Continued)

OTHER PUBLICATIONS

International Search Report for Application No. PCT/EP2014/061525 dated May 15, 2015 (English Translation, 2 pages).

*Primary Examiner* — Antony M Paul
(74) *Attorney, Agent, or Firm* — Michael Best & Friedrich LLP

(57) ABSTRACT

The invention relates to a method for operating an asynchronous machine (1) comprising a rotor (3) and a stator (2), in which a torque of the asynchronous machine (1) is adjusted by specifying a desired magnetic flux of a surrounding magnetic field of the stator (2) and specifying a desired slip between a rotational speed of the rotor (3) and the rotational speed of the surrounding magnetic field. According to the invention, at least in the load condition and when a rotary frequency of the surrounding magnetic field of the stator is equal to zero, the desired magnetic flux and/or the desired slip with constant torque is changed in such a way that an actual rotary frequency of the surrounding magnetic field is not equal to zero.

8 Claims, 1 Drawing Sheet

(58) Field of Classification Search
CPC ... H02K 17/42; H02P 6/00; H02P 6/14; H02P 21/00; H02P 27/04; H02P 23/00; H02P 25/00; H02P 27/00
USPC .......... 318/400.01, 400.02, 400.14, 400.15, 318/400.32, 700, 701, 721, 727, 799, 800, 318/801, 432, 437; 363/44, 95, 120, 174, 363/175

See application file for complete search history.

(56) References Cited

FOREIGN PATENT DOCUMENTS

| | | |
|---|---|---|
| GB | 1389261 | 4/1975 |
| JP | 2003092803 | 3/2003 |
| JP | 2005130601 | 5/2005 |
| JP | 2010028921 | 2/2010 |
| JP | 5168274 | 3/2013 |

\* cited by examiner

METHOD AND DEVICE FOR OPERATING AN ASYNCHRONOUS MACHINE, AND AN ASYNCHRONOUS MACHINE

BACKGROUND OF THE INVENTION

The invention relates to a method for operating an asynchronous machine comprising a rotatably mounted rotor and a stator which is fixed to the housing, wherein a torque of the asynchronous machine is adjusted by specifying a desired magnetic flux of a surrounding magnetic field of the stator and specifying a desired slip between a rotational speed of the rotor and the rotational speed of the surrounding magnetic field.

The invention furthermore relates to a corresponding device for operating an asynchronous machine, which comprises a rotatably mounted rotor and a stator that is fixed to the housing, said device comprising equipment, in particular power electronics, for adjusting a torque of the asynchronous machine, wherein the equipment for adjusting the torque specifies a desired magnetic flux of a surrounding magnetic field of the stator and a desired slip between a rotational speed of the rotor and the rotational speed of the surrounding magnetic field.

The invention furthermore relates to a corresponding asynchronous machine.

Methods, devices and asynchronous machines of the type mentioned above are known from the prior art. The torque of asynchronous machines is particularly dependent on two variables, on the magnetic flux of the magnetic field surrounding the stator and on the slip between the rotational speed of the rotor and the "rotational speed" of the surrounding magnetic field. When driving the asynchronous machine by means of power electronics, the two variables are accordingly manipulated variables to be specified for achieving the desired torque. Particularly during generator operation of the asynchronous machine, a desired slip is adjusted such that a rotary frequency of the surrounding magnetic field is smaller in amount than the rotary frequency of the rotor. In so doing, it is possible using a conventional control algorithm that the desired value of the rotary frequency of the stator field is calculated to be 0 Hz while a significant current is flowing through the stator.

A limitation for the operation of power electronics or, respectively, the equipment actuating the asynchronous machine is the thermal load capacity of the switching elements or, respectively, the power switches. When operating the electrical machine by means of power electronics, a critical operating point can then exist if, in a load condition, a large portion of the current flows for an extended period of time across a single power switch such as, for example, in the case of a B6 bridge. This can, for example, occur in an electric vehicle such that the electrical machine is permanently excited when initiating a driving operation on an uphill, i.e. if a torque is required and the rotational speed of said electrical machine is, for example, still equal to zero.

SUMMARY OF THE INVENTION

The method according to the invention has the advantage that the permanent energization of a single power switch, in particular a semiconductor switching element, is prevented. To this end, the method provides according to the invention that, at least in a load condition, alternatively always, and when a desired rotary frequency of the surrounding stator field of the stator is equal to zero, the desired magnetic flow and/or the desired slip with constant torque is changed in such a way that the actual rotary frequency of the surrounding magnetic field is not equal to zero, i.e. that a minimum rotary frequency is therefore greater than zero. As a result, the inventive method ensures in a simple and cost effective manner that the stator current is not led through a single power switch for an extended period of time but alternately through different power switches, whereby the power electronics are protected from a thermal overload. In order to maintain an actual rotary frequency of the surrounding magnetic field that is not equal to zero, provision is made in a preferable manner for the initially calculated desired rotary frequency to be changed accordingly or, respectively, to be adjusted so as not to equal zero; or for an offset value to be added to the desired rotary frequency, said offset value leading to an appropriate rotary frequency.

Provision is made according to an advantageous modification to the invention for the desired slip to be reduced and the desired magnetic flux, which is proportional to the stator current, to be increased in the load condition with constant torque. In order to achieve the desired rotary frequency of the surrounding magnetic field, provision is thus made for the desired minimum rotary frequency of the surrounding magnetic field with constant torque to be achieved by the desired slip being reduced and the desired magnetic flux, which is proportional to the stator current, being increased.

According to an alternative embodiment of the invention, provision is made for the desired minimum rotary frequency of the surrounding magnetic field with constant torque to be achieved by the desired slip being increased and the desired magnetic flux being reduced.

Provision is furthermore made for the method according to the invention to be carried out during a generator operation of the asynchronous machine. Particularly during the generator operation, the problems mentioned at the beginning of the application can occur. If the method is limited to the generator operation, the necessary computing power for actuating the asynchronous machine can be overall reduced.

The inventive device is characterized in that, in the load condition and when the desired rotary frequency of the surrounding magnetic field of the stator is equal to zero, the equipment for adjusting the torque changes the desired magnetic flux and/or the desired slip with constant torque in such a way that the actual rotary frequency is not equal to zero. The previously mentioned advantages ensue from this fact. Further features and advantages likewise ensue from that which has already been described above.

Provision is particularly made for the desired slip to be reduced and the desired magnetic flux to be increased in the load condition with constant torque in order to bring the actual rotary frequency to a value that is not equal to zero. As a result, an irregular thermal load on power switches of the equipment or, respectively, on the power electronics and on motor phases is circumvented. The performance or, respectively, power of the asynchronous machine is not thereby impaired. According to an alternative embodiment of the invention, provision is made for the desired slip to be increased and the desired magnetic flux to be reduced when the torque is constant in order to obtain the desired minimum rotary frequency.

According to an advantageous modification to the invention, provision is made for the equipment for adjusting the torque to comprise a bridge circuit, in particular a B6 bridge comprising six power switches, in particular semiconductor switching elements or power semiconductor switches.

Other aspects of the invention will become apparent by consideration of the detailed description and accompanying drawings.

BRIEF DESCRIPTION OF THE DRAWINGS

The invention is described below in greater detail with the aid of the drawings. In the drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
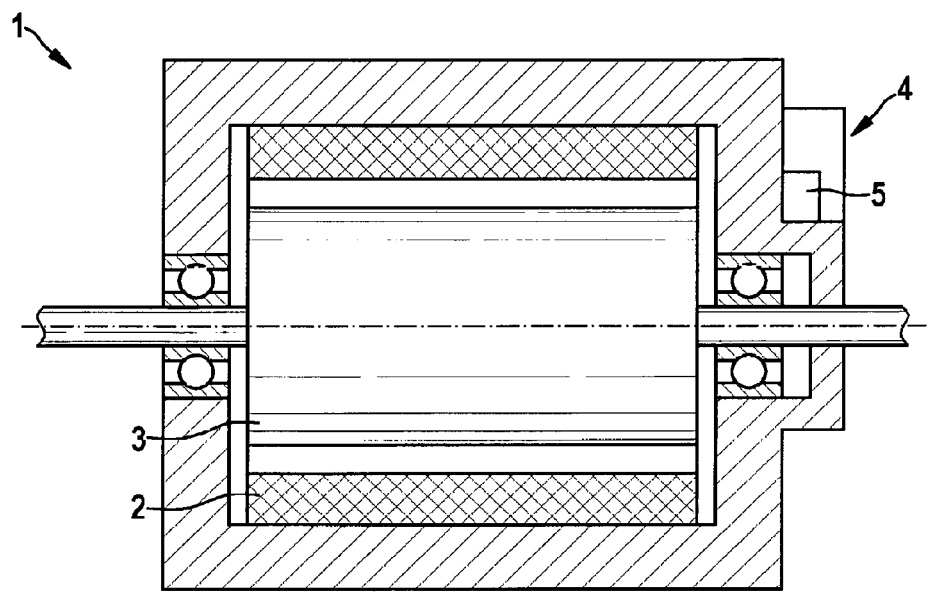
FIG. 1 shows an asynchronous machine in a simplified depiction.
Figure 2:
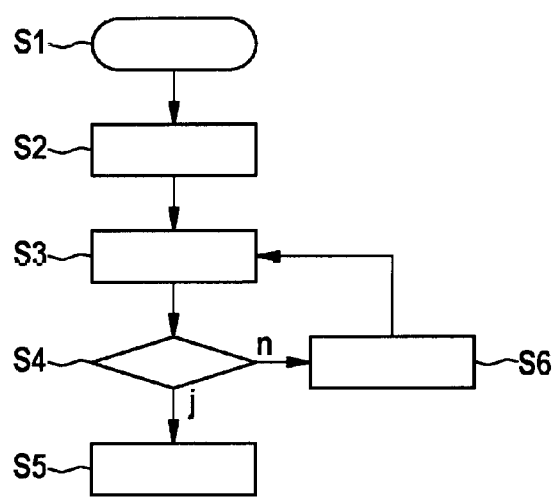
FIG. 2 shows an advantageous method for operating the asynchronous machine.

FIG. 2 shows in a flow diagram a method for operating an asynchronous machine 1, as said machine is depicted by way of example and in a simplified manner in FIG. 1. The asynchronous machine 1 comprises a stator 2 fixed to the housing and a rotatably mounted rotor 3 as well as a device for operating said asynchronous machine. The device 4, which is designed to carry out the method, comprises inter alia equipment which is designed as power electronics 5 and adjusts a torque of the asynchronous machine 1 particularly by specifying a desired magnetic flux of a surrounding magnetic field of the stator and by specifying a desired slip of the rotor, i.e. a difference between the rotational speed of the rotor and the rotational speed of the surrounding magnetic field. To this end, the power electronics have a B6 bridge available or, respectively, a B6 bridge circuit which has six power semiconductor switches.

The method provides that, after starting up a drive device comprising the asynchronous machine 1 in a first step S1, the desired torque is initially determined in step S2. The desired magnetic flux and the desired slip are adjusted in step S2 as a function of the desired torque.

In a subsequent step S3, the method determines to which desired rotary frequency the specified desired magnetic flux and the specified desired slip of the surrounding magnetic field lead.

In a query S4 subsequent to step S3, a check is initially made whether a load condition exists, i.e. whether, for example, a torque is presently required and the rotational speed of the electrical machine is equal to zero. The desired rotary frequency that was ascertained is subsequently checked as to whether it is equal to zero or not equal to zero. Slight deviations from zero are thereby preferably assessed to still be equal to zero.

If the query yields that a load condition exists and the desired rotary frequency of the surrounding magnetic field is not equal to zero, the method continues on in step 5 in which the adjustments performed up to now with regard to the desired values are maintained.

If the query however reveals that the desired rotary frequency ascertained is equal to zero or approximately equal to zero, the desired slip and/or the desired magnetic flux are changed in step 6, wherein the desired torque ascertained in step 2 is maintained. The desired slip is then reduced somewhat and the stator current, which is proportional to the desired magnetic flux, is increased somewhat. Alternatively, the desired slip can be increased and the desired magnetic flux can be reduced. By changing the desired slip and the desired magnetic flux with constant torque, it is ensured that the rotary frequency of the surrounding magnetic field changes from zero to being not equal to zero. This has the effect that the stator current alternately flows through different power semiconductor switches in the power electronics.

The advantageous method ensures that an operation of the asynchronous machine, in which the desired rotary frequency of the surrounding magnetic field is equal to zero, which would result in one of the power switches having a high thermal load, is prevented. As a result, the load on the power electronics is reduced overall and the service life thereof is increased without the performance of the asynchronous machine being impaired. In a particularly preferred manner, the method is then carried out if the asynchronous machine is operated in the generator mode.

The inventive method has the effect that the power switches and motor phases of the asynchronous machine are uniformly loaded. Whether a load condition exists, is, for example, determined, for example, as a function of the demanded torque and the rotational speed of the electrical machine. If a high torque is demanded at a low rotational speed, it can be inferred that a high load, such as, for example, when initiating a driving operation on a hill, and therefore a load condition exists.

The method can be carried out in motor vehicles which have a hybrid drive unit comprising an internal combustion engine and at least one electrical machine as well as in motor vehicles which have only at least one electrical machine as a drive unit.

The invention claimed is:

1. A method for operating an asynchronous machine comprising a rotor and a stator, the method comprising:
   adjusting a torque of the asynchronous machine by specifying a desired magnetic flux of a surrounding magnetic field of the stator and by specifying a desired slip between a rotational speed of the rotor and the rotational speed of the surrounding magnetic field, and
   changing, at least in a load condition and when a rotary frequency of the surrounding magnetic field of the stator is equal to zero, a selection from a group of the desired magnetic flux and the desired slip with constant torque in such a way that an actual rotary frequency of the surrounding magnetic field is not equal to zero.

2. The method according to claim 1, wherein the desired slip is reduced and the desired magnetic flux is increased in the load condition with constant torque.

3. The method according to claim 1, wherein the desired slip is increased and the desired magnetic flux is reduced in the load condition with constant torque.

4. The method according to claim 1, wherein the method is carried out in a generator mode of the asynchronous machine.

5. A device for operating an asynchronous machine comprising a stator and a rotor, wherein the device operates the asynchronous machine by a method, the method comprising,
   adjusting a torque of the asynchronous machine by specifying a desired magnetic flux of a surrounding magnetic field of the stator and by specifying a desired slip between a rotational speed of the rotor and the rotational speed of the surrounding magnetic field, and
   changing, at least in a load condition and when a rotary frequency of the surrounding magnetic field of the stator is equal to zero, a selection from a group of the desired magnetic flux and the desired slip with constant torque in such a way that an actual rotary frequency of the surrounding magnetic field is not equal to zero, and wherein the device comprising equipment for adjusting the torque of the asynchronous machine, wherein the equipment for adjusting the torque specifies the desired magnetic flux of the surrounding magnetic field of the stator and the desired slip between the rotational speed of the rotor and the rotational speed of the surrounding magnetic field.

6. The device according to claim 5, wherein the equipment for adjusting the torque reduces the desired slip and increases the desired magnetic flux in the load condition with constant torque.

7. The device according to claim 5, wherein the equipment for adjusting the torque increases the desired slip and reduces the desired magnetic flux in the load condition with constant torque.

8. The device according to claim 5, wherein the equipment for adjusting the torque has a bridge circuit comprising six semiconductor switching elements.

* * * * *